(12) United States Patent
Cromer et al.

(10) Patent No.: US 6,658,570 B1
(45) Date of Patent: Dec. 2, 2003

(54) METHOD AND SYSTEM IN A DATA PROCESSING SYSTEM FOR ACTIVATING A PASSWORD REQUIREMENT UTILIZING A WIRELESS SIGNAL

(75) Inventors: Daryl Carvis Cromer, Cary, NC (US); Richard Alan Dayan, Wake Forest, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/169,286

(22) Filed: Oct. 8, 1998

(51) Int. Cl.[7] .................................................. H04L 9/00
(52) U.S. Cl. ........................................ 713/200; 380/270
(58) Field of Search ................................ 713/202, 190, 713/193, 183, 182; 380/270

(56) References Cited

U.S. PATENT DOCUMENTS

| | | | |
|---|---|---|---|
| 4,411,017 A | * 10/1983 | Talbot ........................... 455/26 |
| 5,388,156 A | 2/1995 | Blackledge, Jr. et al. |
| 5,396,609 A | 3/1995 | Schmidt et al. |
| 5,708,777 A | * 1/1998 | Sloan et al. ............ 395/188.01 |
| 5,712,973 A | 1/1998 | Dayan et al. |
| 5,903,259 A | * 5/1999 | Brusky et al. .............. 345/168 |
| 5,960,084 A | * 9/1999 | Angelo ........................ 380/25 |
| 5,964,877 A | * 10/1999 | Victor et al. ................ 713/202 |
| 5,974,500 A | 10/1999 | Maletsky et al. |
| 6,038,320 A | * 3/2000 | Miller ........................... 380/44 |
| 6,073,239 A | 6/2000 | Dotan |
| 6,182,144 B1 | * 1/2001 | England ....................... 709/232 |

OTHER PUBLICATIONS

Reid, T.R: Wireless Personal Computers: An Idea Whos Time Has Come. May 1991, The Washington Post. 2 pages.*
IXIS Research LTD.: Always Check Password on Boot. Softheap.com., 2 pages.*
Brad Wallace: Peer to Peer Network Security. Sep. 1995, Computer Bits. vol. 5, No. 9, 2 pages.*
Techtarget.com: Whatis: Interface Device. Copyright 200–2002, techtarget.com. 3 pages.*
Anderson, Christa : LANtastic Security. LAN Magazine vol. 10. Jun. 1995 Miller Freeman Inc. p. 32.*
U.S. patent application Ser. No. 09/181,471,Gregory W. Kilmer, et al., Filed: Oct. 28, 1998, Related Co–Pending Application.

* cited by examiner

Primary Examiner—Ayaz Sheikh
Assistant Examiner—Leynna Ha
(74) Attorney, Agent, or Firm—Carlos Munoz-Bustamante; Bracewell & Patterson, LLP

(57) ABSTRACT

A method and system are described for activating a password requirement in a computer system included within a data processing system. A wireless signal is transmitted to the computer system such that computer system receives the signal. In response to a receipt of the wireless signal, a requirement that a password be entered is activated. Thereafter, a correct entry of a password is required prior to the computer system being fully operable.

16 Claims, 8 Drawing Sheets

| RF MSB | RF LSB | Access Level for RF | Serial MSB | Serial LSB | Access Level for Serial |
|---|---|---|---|---|---|
| 0 | 0 | No access | 0 | 0 | No access |
| 0 | 1 | No access | 0 | 1 | No access |
| 1 | 0 | Read only | 1 | 0 | Read only Write causes NAK |
| 1 | 1 | Unrestricted | 1 | 1 | Unrestricted |

*Fig. 4*

METHOD AND SYSTEM IN A DATA PROCESSING SYSTEM FOR ACTIVATING A PASSWORD REQUIREMENT UTILIZING A WIRELESS SIGNAL

CROSS-REFERENCE TO RELATED APPLICATIONS

The present invention is related to the subject matter of co-pending patent application Ser. No. 09/181,471 entitled DATA PROCESSING SYSTEM AND METHOD FOR PROHIBITING SOFTWARE MODIFICATION OF SYSTEM ACCESS LEVELS and assigned to the assignee herein named filed on Oct. 10, 1998 and incorporated herein by reference.

BACKGROUND OF THE INVENTION

1. Field of the Invention

The present invention relates in general to data processing systems and, in particular, to a data processing system capable of receiving a wireless signal which activates a password requirement. Still more particularly, the present invention relates to a method and system in a data processing system for activating a password requirement in response to a receipt of a wireless signal such that a correct entry of a password is required prior to the computer system being fully operable.

2. Description of the Related Art

Personal computer systems have attained widespread use for providing computing power to many segments of today's modern society. Personal computer systems can usually be defined as a desk top, floor standing, or portable microcomputer that consists of a system unit having at least one system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar, or planar) to electronically connect these components together. These systems are designed primarily to give independent computing power to a single user and are inexpensively priced for purchase by individuals or small businesses. Examples of such personal computer systems are IBM's IntelliStation and IBM's PC 300 PL and PC 300 GL.

Theft and unauthorized use of computer systems are both large problems which can result in lost data and significant costs to businesses. Many known systems exist to protect against these losses.

Computer systems may be protected against unauthorized use by the requirement of the correct entry of a password. Some systems are inoperable without first correctly entering the password. In other systems, a user may access a limited number of functions of the systems while other functions remain unaccessible without the correct entry of the password.

When a password is required, it may be initially set to any value chosen by a user. Once it is set, the chosen password must be correctly entered in order to operate the computer. In order for a business to adequately protect newly received computer systems, each computer system must be powered on and have its password set.

Therefore a need exists for a method and system in a data processing system for activating a password requirement in response to a receipt of a wireless signal.

SUMMARY OF THE INVENTION

It is therefore one object of the present invention to provide an improved data processing system.

It is another object of the present invention to provide a method and system in a data processing system for receiving a wireless signal which activates a password requirement without requiring power being applied to the system.

It is yet another object of the present invention to provide a method and system in a data processing system for activating a password requirement in response to a receipt of a wireless signal such that a correct entry of a password is required prior to the computer system being fully operable.

The foregoing objects are achieved as is now described. A method and system are described for activating a password requirement in a computer system included within a data processing system. A wireless signal is transmitted to the computer system such that computer system receives the signal. In response to a receipt of the wireless signal, a requirement that a password be entered is activated. Thereafter, a correct entry of a password is required prior to the computer system being fully operable.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 4 depicts a pictorial representation of control bits which define access levels associated with a serial and a wireless interface in accordance with the method and system of the present invention;

DETAILED DESCRIPTION OF A PREFERRED EMBODIMENT

Figure 1:
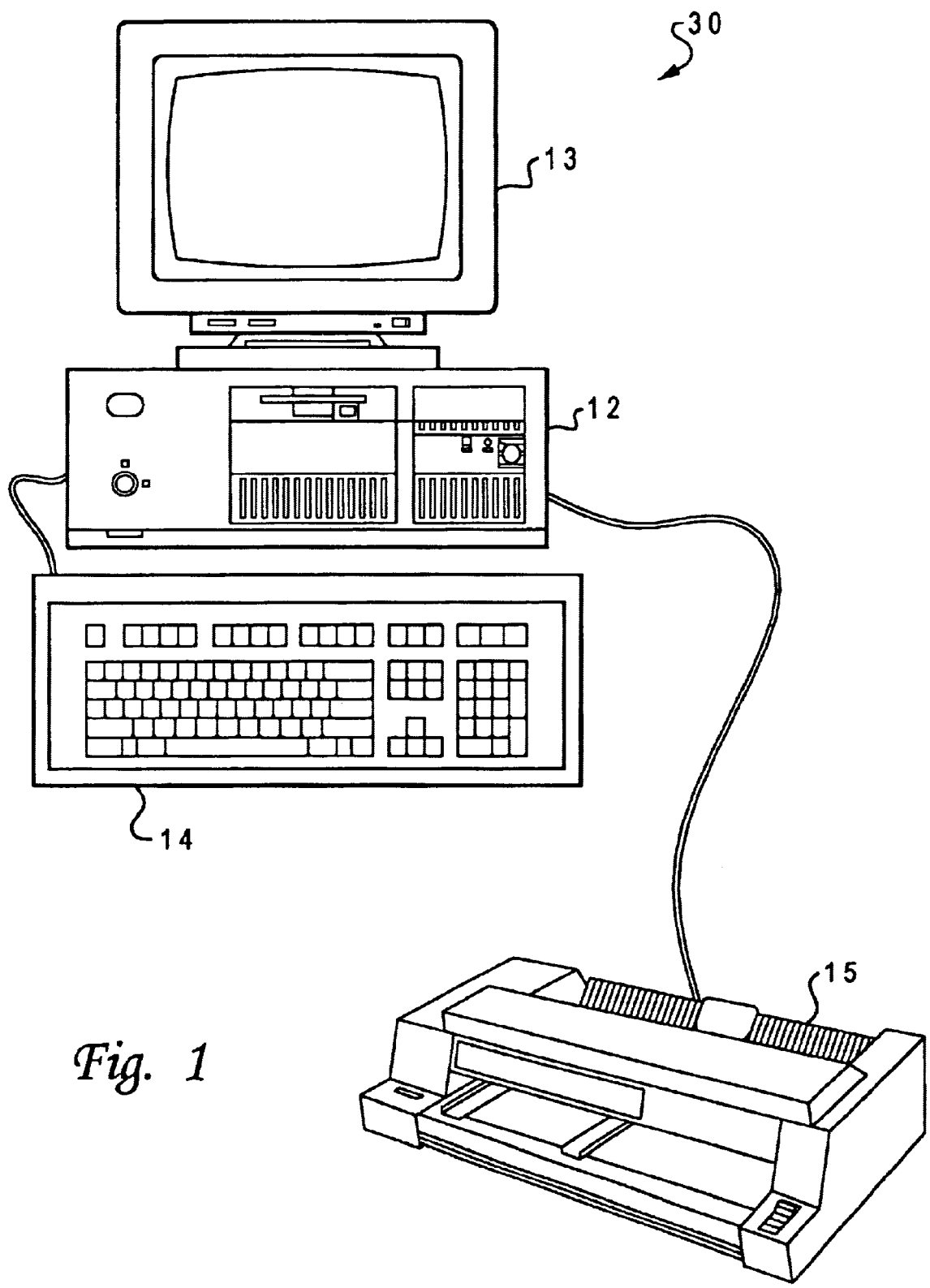
FIG. 1 illustrates a pictorial representation of a computer system in accordance with the method and system of the present invention.

A preferred embodiment of the present invention and its advantages are better understood by referring to FIGS. 1–7 of the drawings, like numerals being used for like and corresponding parts of the accompanying drawings.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts and not as limiting upon the present invention.

The present invention is a method and system for activating a password requirement in a computer system utilizing a wireless signal. Once the password requirement is activated, the password may be modified utilizing a second wireless signal.

The computer system normally requires the password in order to be fully operable. In a preferred embodiment, the password is a privilege access password (PAP). The PAP is a password defined fully in U.S. Pat, No. 5,388,156 issued on Feb. 7, 1995 which is incorporated herein by reference. When a PAP is correctly entered, the user may fully access the computer system and its associated software.

A wireless signal is transmitted to the computer system. In response to a receipt of the wireless signal by the computer system, the requirement of entering a password is activated. Thereafter, a correct entry of the password is required in order to fully operate the computer system. In response to a receipt of a second wireless signal, the password which had already been set may be modified. The computer system does not need to be powered on in order to receive the wireless signals and to set or modify the password. The password requirement may be activated and a password may be either set or modified while the computer system is turned off. In this manner, for example, when new computer systems are initially received, the password requirement may be activated and a password may be set prior to ever removing the computer systems from their original shipping boxes.

In addition, the present invention describes a method and system for establishing an access level, or multiple different access levels, for each storage location within the computer system. The access level defines whether a received command attempting to access a storage location will be processed without a correct entry of the password.

In a preferred embodiment, the computer system includes both a serial interface and a wireless interface. Each storage location within the computer system has an associated access level for the serial interface and the wireless interface. When a command is received which attempts to access a storage location, a determination is made of which interface the command is utilizing to access the storage location. Thereafter, a determination is made as to whether a password is required in order to permit the execution of this command, i.e. permit access of the specified storage location through the determined interface. If a determination is made that this command must include a valid password in order to access the storage location through the specified interface, the command will be executed only if it includes such a password. Otherwise, the command will not be executed.

FIG. 1 illustrates a pictorial representation of a computer system and a transmitter for transmitting a wireless signal to deactivate a password requirement in accordance with the method and system of the present invention. Computer system 30 includes a computer 12, a monitor 13, a keyboard 14, and a printer or plotter 15.

Figure 2:
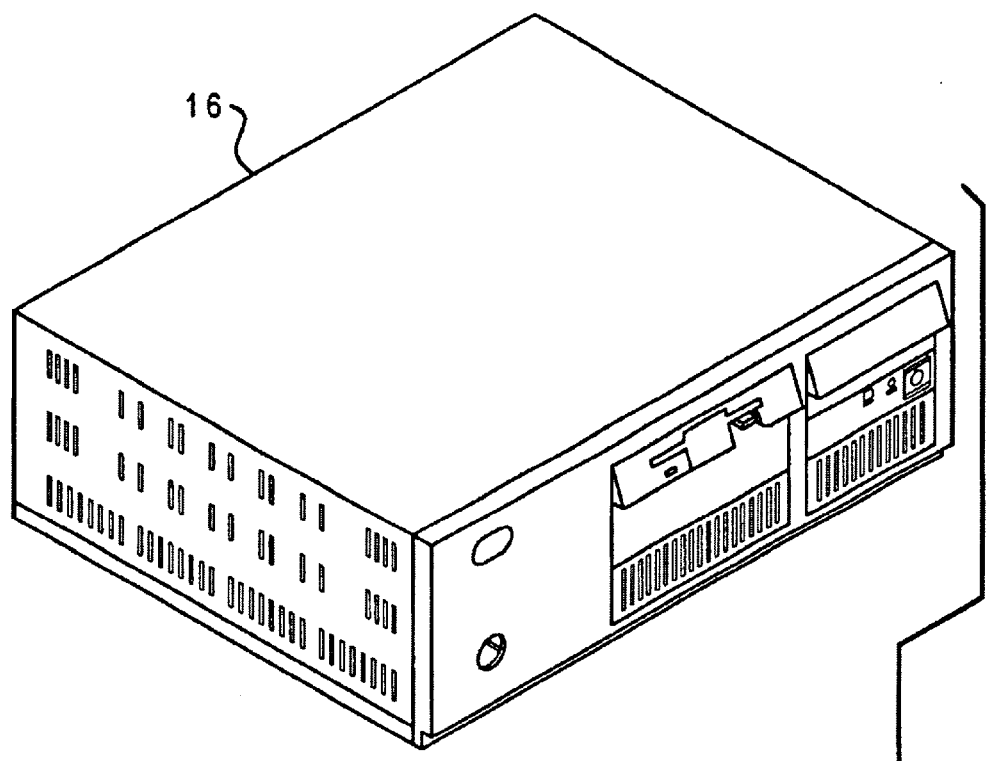
FIG. 2 depicts a pictorial representation of an exploded view of computer 12 in accordance with the method and system of the present invention.
Figure 2:
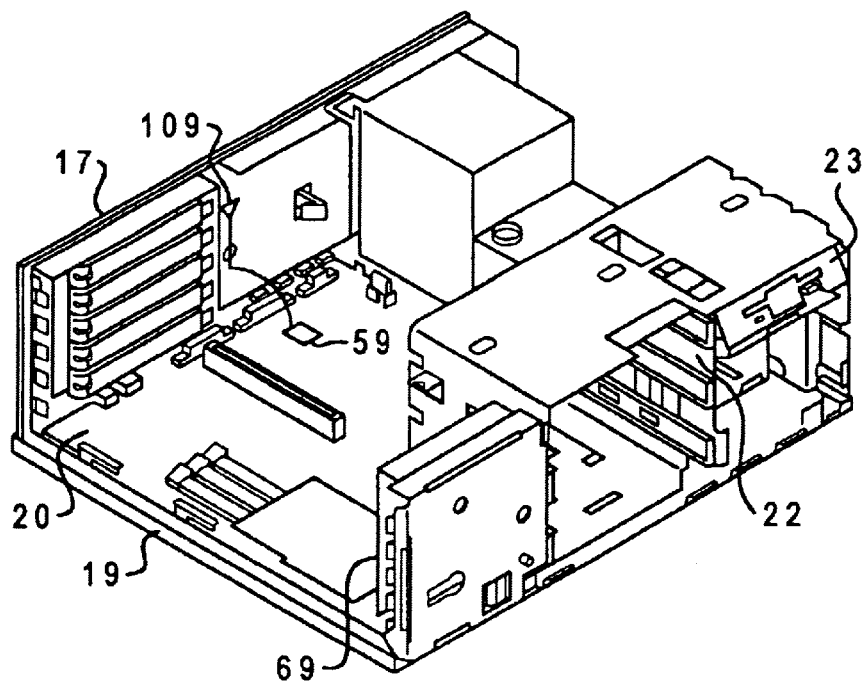

FIG. 2 depicts a pictorial representation of an exploded view of computer 12 in accordance with the method and system of the present invention. Computer 12 has a cover 16 which cooperates with a chassis 19 in defining an enclosed shielded volume for receiving data processing and storage components for processing and storing digital data. At least certain of the system components are mounted on a multilayer planar 20 (also commonly called a motherboard or system board) which is mounted on the chassis 19 and provides a means for mounting and electrically interconnecting various components of computer 12 including the CPU, system memory, and accessory cards or boards as is well known in the art.

Chassis 19 has a base and a rear panel 17 and defines at least one open bay 22 for receiving a data storage device such as a disk drive 23. An antenna 109 is mounted to extend outside computer 12 to collect radiation having a predefined characteristic. Antenna 109 is intended to provide a signal to system 30 indicating radiation having the predefined characteristic in the vicinity of computer system 30.

Figure 3:
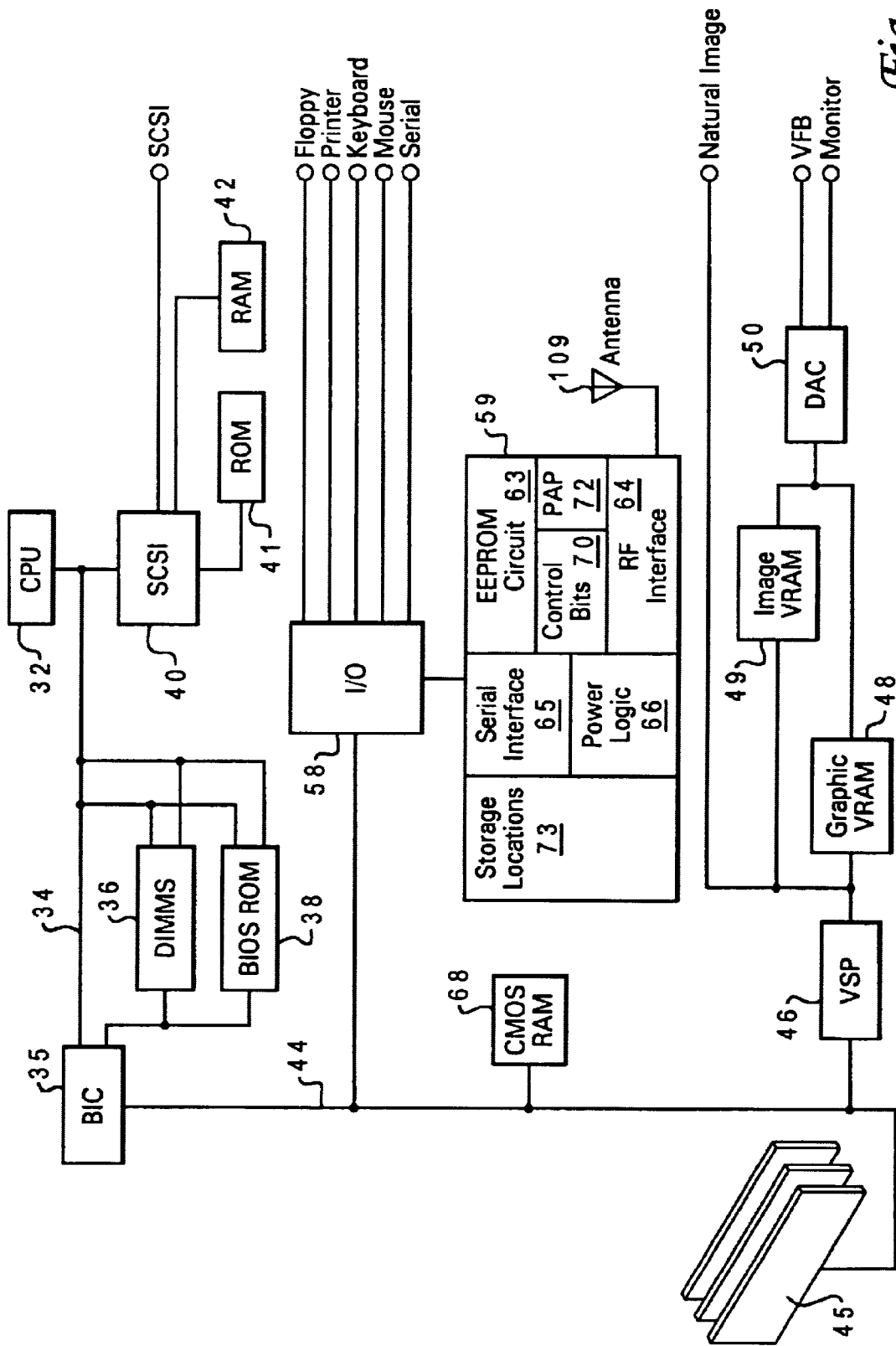
FIG. 3 illustrates a high level block diagram of computer system 30 illustrating the various components of computer system 30 in accordance with the method and system of the present invention.

FIG. 3 illustrates a high level block diagram of computer system 30 illustrating the various components of computer system 30 in accordance with the method and system of the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the Pentium which is sold by INTEL. The CPU 32 is connected by a high speed CPU local bus 34 to a bus interface control unit 35, volatile random access memory (RAM) 36 here shown as Dual Inline Memory Modules (DIMMS), and to BIOS ROM 38 in which is stored instructions for basic input/output operations to the CPU 32. The BIOS ROM 38 includes the BIOS that is used to interface between the I/O devices and the operating system of the microprocessor 32. Instructions stored in the BIOS ROM 38 can be copied into RAM 36 to decrease the execution time of BIOS. The system also has, as has become conventional, a circuit component which has battery backed non-volatile memory 68 (conventionally CMOS RAM) for receiving and retaining data regarding the system configuration and a real time clock (RTC).

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel Pentium or Pentium II microprocessor.

Returning again to FIG. 3, the CPU local bus 34 (comprising data, address, and control components) also provides for the connection of the microprocessor 32 with a Small Computer Systems Interface (SCSI) controller 40. The SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

Bus interface controller (BIC) 35 couples CPU local bus 34 with an I/O bus 44. By means of bus 44, BIC 35 is coupled with an optional feature bus such as a PCI bus having a plurality of I/O slots for receiving PCI adapter cards 45 which may be further connected to an I/O device or memory (not shown). The I/O bus 44 includes address, data, and control components.

Coupled along I/O bus 44 are a variety of I/O components such as a video signal processor 46 which is associated with video RAM (VRAM) for storing graphic information 48 and for storing image information 49. Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc.

The I/O bus 44 is coupled utilizing an input/output controller 58 to an associated Electrical Erasable Programmable Read Only Memory (EEPROM) 59. Conventional peripherals, such as floppy disk drives, a printer or plotter 15, keyboard 14 and a mouse or pointing device (not shown), are coupled to I/O bus 44 utilizing I/O controller 58.

EEPROM 59 includes an EEPROM circuit 63, a serial interface 65 for inputting and outputting signals, a radio frequency (RF) interface 64 for receiving wireless signals, a power management logic circuit 66, control bits 70, a storage location for storing a password 72, and a plurality of storage locations 73 within EEPROM 59.

Storage locations 73 preferably store asset information about computer system 30, as well as other data. Typically, the asset information will include the serial number of computer system 30 and other information such as licensing information. Those skilled in the art will recognize that there are unlimited different types of data that may be stored in storage locations 73.

FIG. 4 depicts a pictorial representation of control bits 70 which define access levels associated with a serial and a wireless interface in accordance with the method and system of the present invention. Two different sets of two bits exist and are associated with each storage location. One example of all possible combinations of bits for each set of control bits is depicted in FIG. 4. When a command is received which attempts to access one of the storage locations 73, a determination is made as to through which interface the access is attempted. If wireless interface 64 is utilized, control bits 74 associated with this storage location are used to determine an access level. If serial interface 65 is utilized, control bits 75 associated with this storage location are used to determine an access level.

Control bits 74 define the access level for wireless interface 64 which determines the type of access a command may have to the storage location associated with control bits 74 through wireless interface 64. Control bits 75 define the access level for serial interface 65 which determines the type of access a command may have to the storage location associated with control bits 75 through serial interface 65.

The access levels are defined as the level permitted for a command which does not include a valid password. If a command includes a valid password, it will be executed regardless of the settings of the associated control bits for that specified storage location.

For example, for a particular storage location, control bits 74 may be stored as a "10". In this case, a command which attempts to read the storage location through wireless interface 64 will be executed. If this command had attempted to write to this storage location, the command would not be executed unless the command also included a correct password. If a correct password was included with the command, the command would be executed.

For this same storage location, control bits 75 are also associated and may be set as a "10". In this case, a command which attempts to read the storage location through serial interface 65 will be executed. If this command had attempted to write to this storage location, the command would not be executed unless the command also included a correct password. If a correct password was included with the command, the command would be executed.

Figure 5:
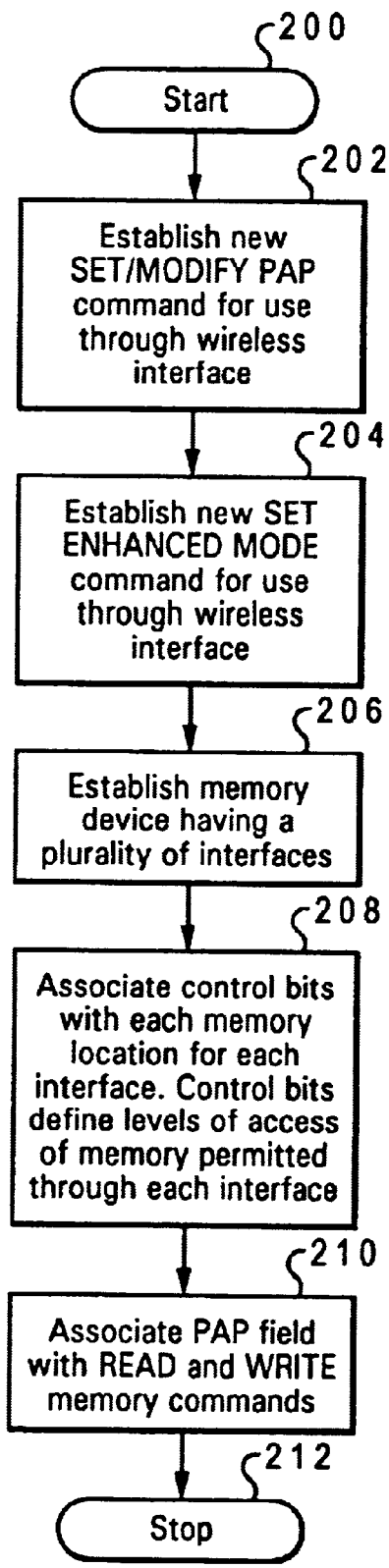
FIG. 5 illustrates a high level flow chart which depicts establishing commands which utilize a wireless interface and the association of access levels with storage locations in accordance with the method and system of the present invention.

FIG. 5 illustrates a high level flow chart which depicts establishing commands which utilize a wireless interface and the association of access levels with storage locations in accordance with the method and system of the present invention. The process starts as depicted by block 200 and thereafter passes to block 202 which illustrates establishing a new SET PAP command and a new MODIFY PAP command which are utilized through wireless interface 64. Thereafter, block 204 depicts establishing a new SET ENHANCED MODE command which is utilized through wireless interface 64.

Next, block 206 illustrates establishing a memory device, such as EEPROM 59 having a plurality of interfaces. The process then passes to block 208 which depicts the association of control bits with each memory location for each interface. The control bits define levels of access of the storage location permitted through each interface. Thereafter, block 210 illustrates associating a password field with each read and write memory commands. In this manner, a field exists into which a password may be included to be processed when the associated command is processed. The process then terminates as depicted by block 212.

Figure 6A:
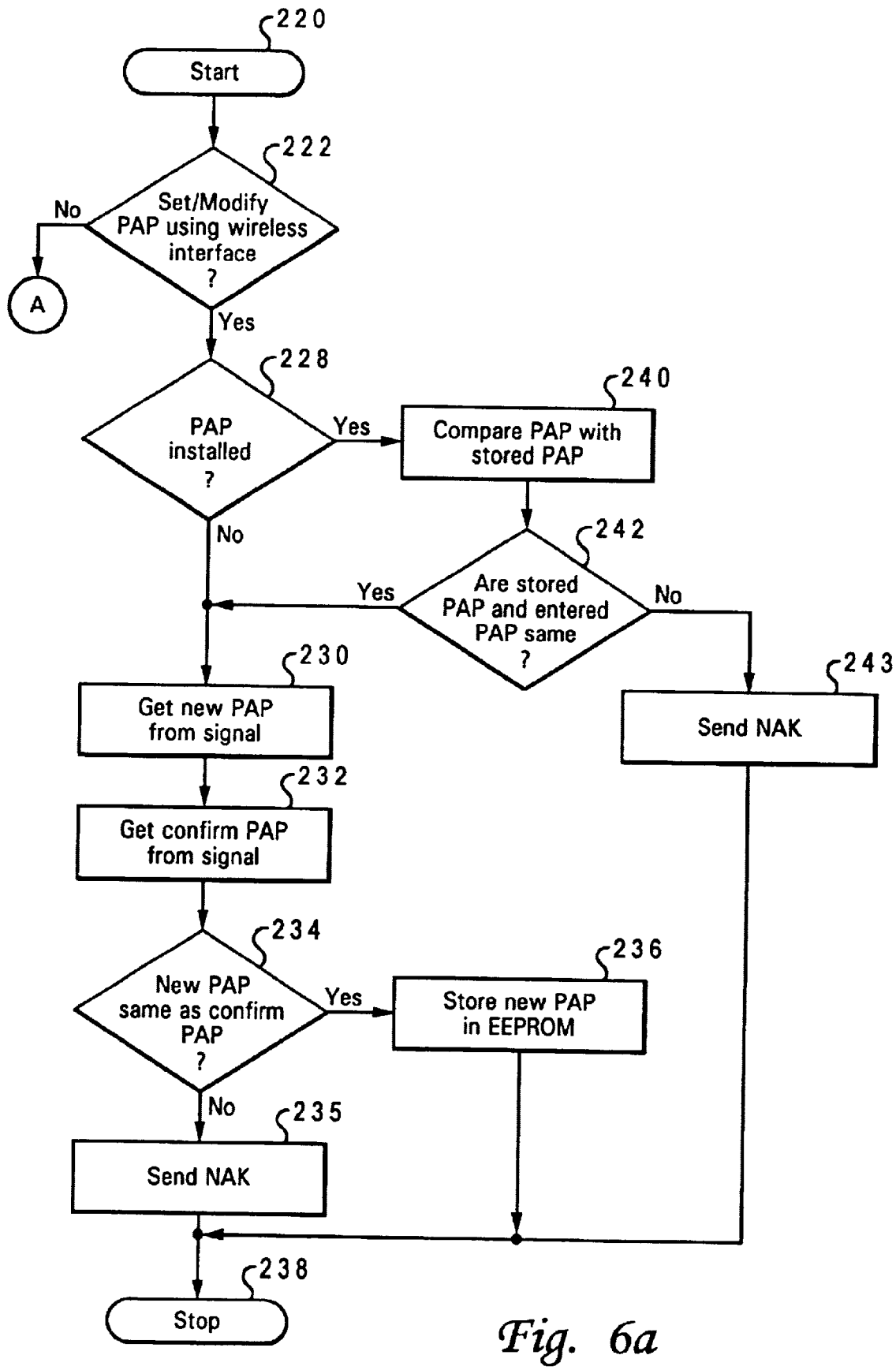
FIGS. 6a and 6b together depict a high level flow chart which illustrates the execution of commands which utilize a wireless interface to set or modify a password in accordance with the method and system of the present invention.
Figure 6B:
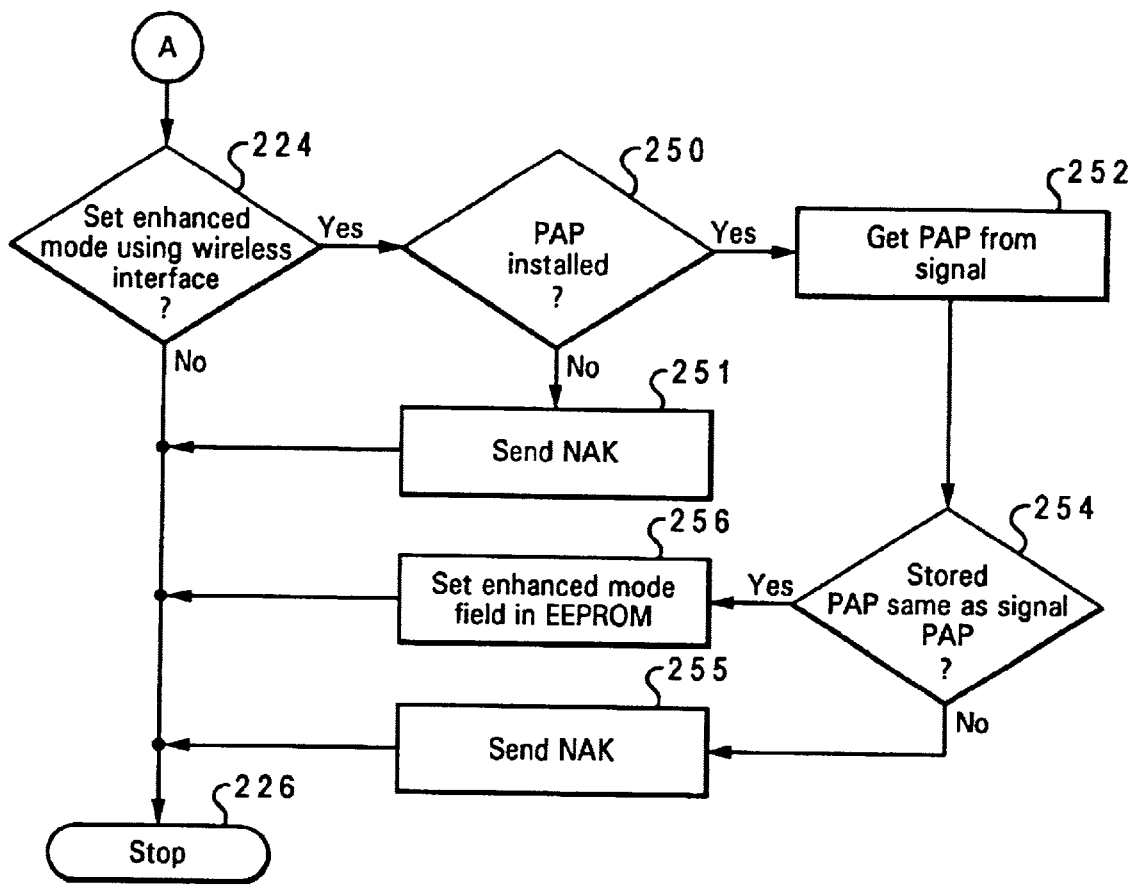

FIGS. 6a and 6b together depict a high level flow chart which illustrates the execution of commands which utilize a wireless interface to set or modify a password in accordance with the method and system of the present invention. The process starts as depicted by block 220 and thereafter passes to block 222 which illustrates a determination of whether or not a wireless signal has been received by computer system 30 which attempts to either set or modify a password such as a PAP utilizing wireless interface 64. If a determination is made that no such signal has been received, the process passes to block 224 which illustrates a determination of whether or not a wireless signal has been received which attempts to set an enhanced mode in computer system 30 utilizing wireless interface 64. If a determination is made that no such signal has been received, the process terminates as depicted by block 226.

Referring again to block 222, if a determination is made that a wireless signal has been received which attempts to set or modify the PAP, the process passes to block 228 which depicts a determination of whether or not a PAP has already been installed. If a determination is made that a PAP has not already been installed, the process passes to block 230 which illustrates getting a new PAP included within the received signal. Next, block 232 depicts getting a confirming PAP from within the received signal. Thereafter, block 234 illustrates a determination of whether or not the new and confirming PAP are the same. If a determination is made that the new and confirming PAP are the same, the process passes to block 236 which depicts the storage of the new PAP in EEPROM 59. Referring again to block 234, if a determination is made that the new PAP is not the same as the confirming PAP, the process passes to block 235 which illustrates the sending of a negative acknowledgement (NAK). The process then terminates as depicted by block 238.

Referring again to block 228, if a determination is made that a PAP has been installed, the process passes to block 240 which illustrates the comparison of the stored PAP with the PAP received within this command. Thereafter, block 242 depicts a determination of whether or not the stored PAP and the PAP received within this command are the same. If a determination is made that the stored PAP and the received PAP are not the same the process passes to block 243 which depicts the sending of a negative acknowledgement (NAK). The process then terminates as illustrated by block 238. Referring again to block 242, if a determination is made that the stored PAP and the received PAP are the same, the process passes to block 230.

Referring again to block 224, if a determination is made that a wireless signal has been received which attempts to set an enhanced mode in computer system 30 utilizing wireless interface 64, the process passes to block 250 which illustrates a determination of whether or not a password has already been installed. If a determination is made that a password has not already been installed, the process passes to block 251 which depicts the sending of a negative acknowledgement (NAK). Thereafter, the process terminates as illustrated by block 226.

Referring again to block 250, if a determination is made that a password has already been installed, the process passes to block 252 which depicts getting the password which is included within the received wireless signal. Next, block 254 illustrates a determination of whether or not the stored password, the password already installed, is the same as the password received within the wireless signal. If a determination is made that the stored password and the received password are the same, the process passes to block 256 which depicts setting the enhanced mode field in EEPROM 59. Thereafter, the process terminates as illustrated by block 226. Referring again to block 254, if a determination is made that the stored password and the received password are different, the process passes to block 255 which depicts the sending of a NAK. Thereafter, the process terminates as illustrated by block 226.

Figure 7:
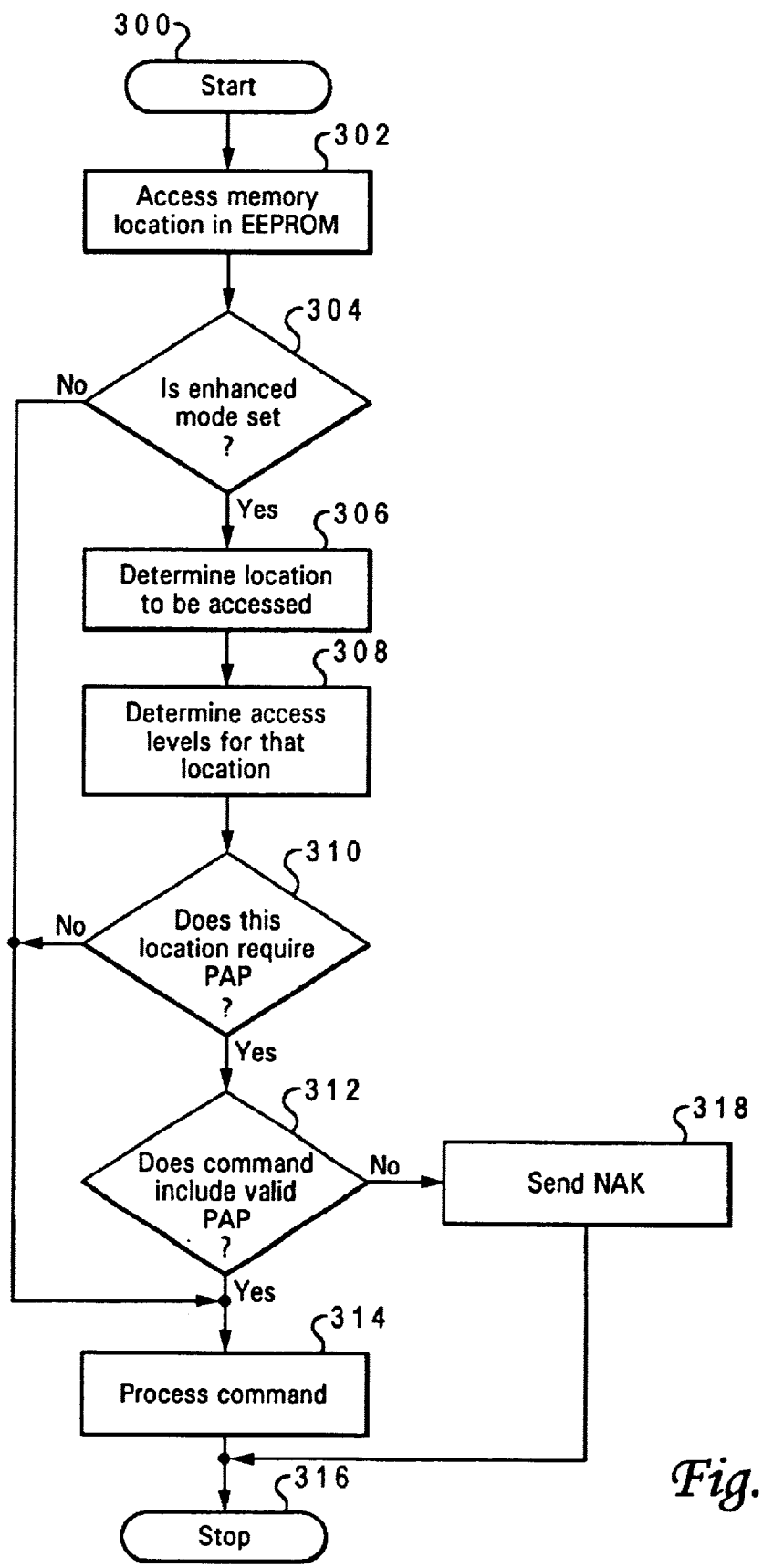
FIG. 7 illustrates a high level flow chart which depicts the execution of commands which attempt to access a storage location in accordance with the method and system of the present invention.

FIG. 7 illustrates a high level flow chart which depicts the execution of commands which attempt to access a storage location in accordance with the method and system of the present invention. The process starts as depicted at block 300 and thereafter passes to block 302 which illustrates the accessing of a memory location 73 within EEPROM 59. Next, block 304 depicts a determination of whether or not an enhanced mode is set. If a determination is made that the enhanced mode is not set, a password is not required in order to execute the command. Therefore, the process passes to block 314. Referring again to block 304, if a determination is made that the enhanced mode is set, the process passes to block 306 which illustrates determining which storage is to be accessed by this command.

Next, block 308 depicts determining an access level for each interface for this storage location utilizing the control bits. The process then passes to block 310 which illustrates a determination of whether or not this command can be executed without including a valid password. If a determination is made that a valid password is not required to access this storage location through the interface associated with the command, the process passes to block 314.

Referring again to block 310, if a determination is made that a valid password is required to access this storage location through the interface associated with the command, the process passes to block 312 which depicts a determination of whether or not a valid password is included in the command. If a determination is made that a valid password is not included, a negative acknowledgement (NAK) is sent as illustrated by block 318. The process then terminates as illustrated by block 316. Referring again to block 312, if a determination is made that a valid password is included, the process passes to block 314 which illustrates process, or executing, the command, The process then terminates as depicted by block 316.

While a preferred embodiment has been particularly shown and described, it will be understood by those skilled in the art that various changes in form and detail may be made therein without departing from the spirit and scope of the present invention.

What is claimed is:

1. A method in a data processing system having both a wireless interface and a keyboard for activating a password requirement in a computer system included within said data processing system wherein said computer system can be accessed without entry of a password, said method comprising the steps of:

establishing a plurality of storage locations within said computer system;

establishing a serial interface within said computer system;

establishing a first plurality of a plurality of commands which attempt to access said plurality of storage locations utilizing said serial interface, wherein said first plurality of said plurality of commands is associated with said serial interface;

transmitting a wireless signal to said computer system via said wireless interface, wherein said computer system receives said wireless signal;

in response to a receipt of said wireless signal, activating a password requirement in said computer system; and thereafter, requiring a user to enter a correct entry of a password at said keyboard prior to said computer system being fully operable.

2. The method according to claim 1, further comprising the steps of:

transmitting a second wireless signal to said computer system, wherein said computer system receives said second wireless signal; and in response to a receipt of said second wireless signal, requiring a correct entry of a modified password prior to said computer system being fully operable.

3. The method according to claim 2, wherein said steps of transmitting a wireless signal to said computer system, and in response to a receipt of said wireless signal, activating a password requirement in said computer system further comprises the steps of transmitting a wireless signal to said computer system while said computer system is in a powered-off state, and in response to a receipt of said wireless signal, activating a password requirement in said computer system while said computer system is in a powered-off state.

4. The method according to claim 3, further comprising the steps of:

establishing a second plurality of said plurality of commands which attempt to access said plurality of storage locations utilizing said wireless interface, wherein said second plurality of said plurality of commands is associated with said wireless interface.

5. The method according to claim 1, further comprising the steps of:

associating each of said plurality of storage locations with a serial access level, said serial access level defining whether a password is required for access to each of said plurality of storage locations utilizing said serial interface; and associating each of said plurality of storage locations with a wireless access level, said wireless access level defining whether a password is required for access to each of said plurality of storage locations utilizing said wireless interface.

6. The method according to claim 5, further comprising the steps of:

receiving one of said plurality of commands;

determining an interface associated with said one of said plurality of commands;

determining one of said plurality of storage locations associated with said one of said plurality of commands; and determining an access level for said one of said plurality of storage locations for said interface.

7. The method according to claim 6, wherein said step of determining an access level further comprises the step of determining whether a password is required in order to permit said one of said plurality of commands to access said one of said plurality of storage locations utilizing said interface.

8. The method according to claim 7, further comprising the steps of:

in response to a determination that said password is required, determining if said one of said plurality of commands is associated with said password;

in response to a determination that said one of said plurality of commands is associated with said password, executing said one of said plurality of commands, wherein said one of said plurality of commands accesses said one of said plurality of storage locations utilizing said interface, and in response to a determination that said one of said plurality of commands is not associated with said password, prohibiting execution of said one of said plurality of commands, wherein access to said one of said plurality of storage locations utilizing said interface is prohibited.

9. A data processing system for activating a password requirement in a computer system included within said data processing system wherein said computer system includes both a wireless interface and a keyboard and can be accessed without entry of a password, comprising:

means for establishing a plurality of storage locations within said computer system;

means for establishing a serial interface within said computer system;

means for establishing a first plurality of a plurality of commands which attempt to access said plurality of storage locations utilizing said serial interface, wherein said first plurality of said plurality of commands is associated with said serial interface;

means for transmitting a wireless signal to said computer system via said wireless interface, wherein said computer system receives said wireless signal;

means responsive to a receipt of said wireless signal, for activating a password requirement in said computer system; and means for thereafter requiring a user to enter a correct entry of a password via said keyboard prior to said computer system being fully operable.

10. The system according to claim 9, further comprising:

means for transmitting a second wireless signal to said computer system, wherein said computer system receives said second wireless signal; and means responsive to a receipt of said second wireless signal, for requiring a correct entry of a modified password prior to said computer system being fully operable.

11. The system according to claim 10, wherein said means for transmitting a wireless signal to said computer system, and means responsive to a receipt of said wireless signal, for activating a password requirement in said computer system further comprises means for transmitting a wireless signal to said computer system while said computer system is in a powered-off state, and means responsive to a receipt of said wireless signal, for activating a password requirement in said computer system while said computer system is in a powered-off state.

12. The system according to claim 11, further comprising:

means for establishing a second plurality of said plurality of commands which attempt to access said plurality of storage locations utilizing said wireless interface, wherein said second plurality of said plurality of commands is associated with said wireless interface.

13. The system according to claim 9, further comprising:

means for associating each of said plurality of storage locations with a serial access level, said serial access level defining whether a password is required for access to each of said plurality of storage locations utilizing said serial interface; and means for associating each of said plurality of storage locations with a wireless access level, said wireless access level defining whether a password is required for access to each of said plurality of storage locations utilizing said wireless interface.

14. The system according to claim 13, further comprising:

means for receiving one of said plurality of commands;

means for determining an interface associated with said one of said plurality of commands;

means for determining one of said plurality of storage locations associated with said one of said plurality of commands; and means for determining an access level for said one of said plurality of storage locations for said interface.

15. The system according to claim 14, wherein said means for determining an access level further comprises means for determining whether a password is required in order to permit said one of said plurality of commands to access said one of said plurality of storage locations utilizing said interface.

16. The system according to claim 15, further comprising:

means responsive to a determination that said password is required, for determining if said one of said plurality of commands is associated with said password;

means responsive to a determination that said one of said plurality of commands is associated with said password, for executing said one of said plurality of commands, wherein said one of said plurality of commands accesses said one of said plurality of storage locations utilizing said interface, and means responsive to a determination that said one of said plurality of commands is not associated with said password, for prohibiting execution of said one of said plurality of commands, wherein access to said one of said plurality of storage locations utilizing said interface is prohibited.

* * * * *